(12) United States Patent
Hung (10) Patent No.: US 10,935,179 B2
(45) Date of Patent: Mar. 2, 2021

(54) WIRE PRESSING AND HOLDING DEVICE FOR AN EXTENSION ARM SUPPORT MECHANISM

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/535,429

(22) Filed: Aug. 8, 2019

(65) Prior Publication Data

US 2020/0067290 A1 Feb. 27, 2020

(30) Foreign Application Priority Data

Aug. 21, 2018 (TW) .................. 107211462

(51) Int. Cl.
*F16M 11/20* (2006.01)
*H02G 3/04* (2006.01)
*F16M 13/02* (2006.01)

(52) U.S. Cl.
CPC ..... *F16M 11/2007* (2013.01); *F16M 11/2014* (2013.01); *F16M 13/022* (2013.01); *F16M 2200/066* (2013.01); *H02G 3/0462* (2013.01)

(58) Field of Classification Search
CPC ........ F16M 11/06; F16M 11/08; F16M 11/10; F16M 11/12; F16M 11/2007; F16M 11/2014; F16M 11/2021; F16M 11/2035; H04M 1/0262; H02G 3/0462

USPC .......... 429/97, 100; 220/324, 326; 341/176; 292/13, 209, 249

See application file for complete search history.

(56) References Cited

U.S. PATENT DOCUMENTS

| | | | | |
|---|---|---|---|---|
| 5,758,769 A * | 6/1998 | Vasudeva | ............... | B25H 3/003 206/372 |
| 6,126,221 A * | 10/2000 | Kern | ........................ | B60R 7/04 296/37.7 |
| 6,394,300 B1 * | 5/2002 | Bosy | ................... | H01M 2/1055 220/242 |
| 6,609,691 B2 * | 8/2003 | Oddsen, Jr. | ............ | F16M 11/10 248/278.1 |
| 7,330,216 B2 * | 2/2008 | Purdy | ................. | H04M 1/0262 348/207.99 |
| 8,104,728 B2 * | 1/2012 | Chen | ................... | F16M 13/022 248/286.1 |
| 8,212,708 B2 * | 7/2012 | Nozoe | ................... | G08O 23/04 341/176 |

(Continued)

*Primary Examiner* — Jonathan Liu
*Assistant Examiner* — Guang H Guan
(74) *Attorney, Agent, or Firm* — DLA Piper LLP (US)

(57) ABSTRACT

A wire pressing and holding device is removably mounted on a first extension arm of an extension arm support mechanism to cover a channel thereof, and includes a cover plate, an engaging protrusion projecting from a first end of the cover plate to be inserted into an engaging recess of the arm to serve as a fulcrum such that a second end of the cover plate is turnable relative to the arm, and a releasably retaining member connected to the second end and configured to be displaceable relative to the second end between a retaining position to retainingly abut against the arm for pressing and holding a wire assembly in the channel, and a releasing position to be disengaged from the arm.

3 Claims, 11 Drawing Sheets

(56) References Cited

U.S. PATENT DOCUMENTS

| | | | |
|---|---|---|---|
| 8,217,266 B2* | 7/2012 | Caveney | H02G 3/0418 |
| | | | 174/70 C |
| 8,794,579 B2* | 8/2014 | Sturman | F16M 11/105 |
| | | | 248/284.1 |
| 9,228,696 B2* | 1/2016 | Borloz | F16M 13/02 |
| 10,203,064 B2* | 2/2019 | Glaser | F16G 11/12 |
| 2019/0086022 A1* | 3/2019 | Anderson | F16M 11/2092 |
| 2020/0063896 A1* | 2/2020 | Hung | F16M 11/10 |
| 2020/0067290 A1* | 2/2020 | Hung | F16M 13/022 |

* cited by examiner

WIRE PRESSING AND HOLDING DEVICE FOR AN EXTENSION ARM SUPPORT MECHANISM

CROSS-REFERENCE TO RELATED APPLICATION

This application claims priority of Taiwanese Patent Application No. 107211462, filed on Aug. 21, 2018.

FIELD

The disclosure relates to an extension arm support mechanism, and more particularly to a wire pressing and holding device for an extension arm support mechanism.

BACKGROUND

Figure 1:
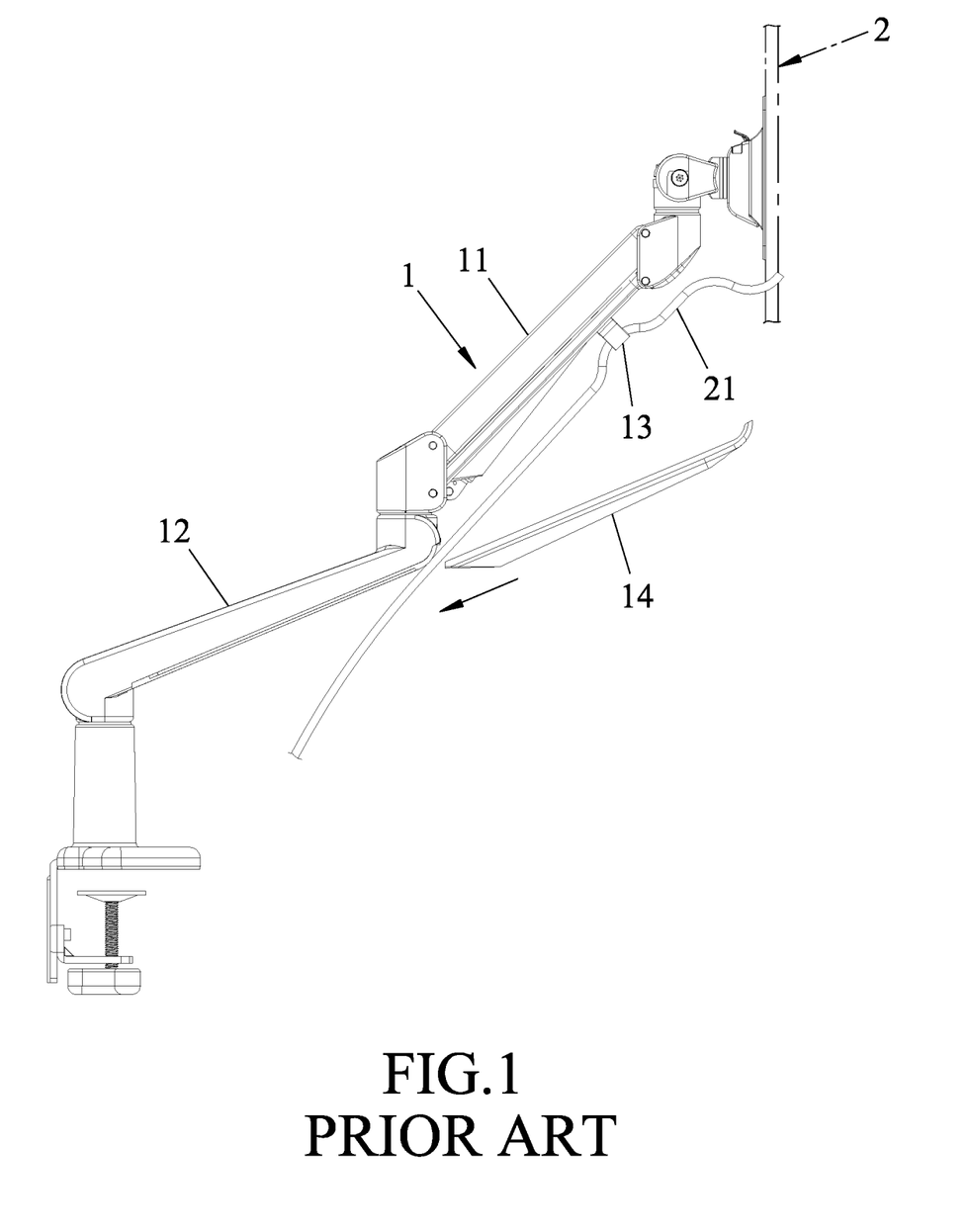
FIG. 1 is a schematic side view of a conventional extension arm support mechanism.

Referring to FIG. 1, a conventional extension arm support mechanism 1 is for supporting an electronic device (such as a monitor display), which includes a wire assembly 21, to be connected with a power supply (not shown). The support mechanism 1 includes two extension arms 11, 12 pivotably connected to each other for adjusting relative angular position, a hook 13 mounted on the extension arm 11 for gripping and holding the wire assembly 21 in close proximity to the extension arm 11, and a sliding cover 14 slidably mounted on the extension arm 12. The extension arm 12 and the sliding cover 14 cooperatively define a channel (not shown) that permits the wire assembly 21 to pass therethrough. However, since the wire assembly is received in the channel, sliding movement of the sliding cover 14 relative to the extension arm 12 may not be as smooth. In addition, if the wire assembly 21 does not fit in the channel perfectly, it may be easily pulled and damaged by the sliding movement of the sliding cover 14.

SUMMARY

Therefore, an object of the disclosure is to provide a wire pressing and holding device for an extension arm support mechanism that can alleviate at least one of the drawbacks of the prior art.

According to the disclosure, the wire pressing and holding device is mountable on an extension arm support mechanism. The extension arm support mechanism includes a first extension arm which extends in a longitudinal direction and which has an inner channel wall surface that defines a channel having an opening at a long side in the longitudinal direction, and that has two short sides at two opposite ends of the long side, and an engaging recess formed at one of the short sides and communicated with the channel. The wire pressing and holding device includes a cover plate, an engaging protrusion and a releasably retaining member. The cover plate has a peripheral rim which is configured to matingly engage the opening and which has first and second ends opposite to each other in the longitudinal direction, and a plate wall which is configured to close the channel and which has an inner pressing wall surface that confronts the channel. The engaging protrusion projects from the first end to be inserted into the engaging recess to serve as a fulcrum such that the second end of the cover plate is turnable relative to the first extension arm between an engaging position, where the second end is close to the other one of the short sides of the inner channel wall surface, and a disengaging position, where the second end is remote from the other short side. The releasably retaining member is connected to the second end of the cover plate to be turned with the second end relative to the first extension arm, and is configured to be displaceable relative to the second end when the second end is in the engaging position between a retaining position, where the releasably retaining member retainingly abuts against the other short side of the inner channel wall surface, and a releasing position, where the releasably retaining member is disengaged from the other short side of the inner channel wall surface.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 5, a first embodiment of a wire pressing and holding device 5 according to the disclosure is mounted on an extension arm support mechanism 4. The extension arm support mechanism 4 supports an electronic device 3 (such as a monitor display), which includes a wire assembly 31 connected to a power supply (not shown).

The extension arm support mechanism 4 includes a first extension arm 41 and a second extension arm 42 pivotably connected to the first extension arm 41. The first extension arm 41 extends in a longitudinal direction (X), and has an inner channel wall surface 411, an outer channel wall surface 412, and a peripheral rim 413. The inner channel wall surface 411 has a long side that extends in the longitudinal direction (X) and two short sides at two opposite ends of the long side, and defines a channel 410 that has an opening at the long side. The inner channel wall surface further has an engaging recess 414 that is formed at one of the short sides and that is communicated with the channel 410. The outer channel wall surface 412 is opposite to the inner channel wall surface 411, and has a concavity 415 that is formed at the other one of the short sides and that is communicated with the channel 410. The peripheral rim 413 is interposed between the outer and inner channel wall surfaces 412, 411 to define the opening.

Figure 3:
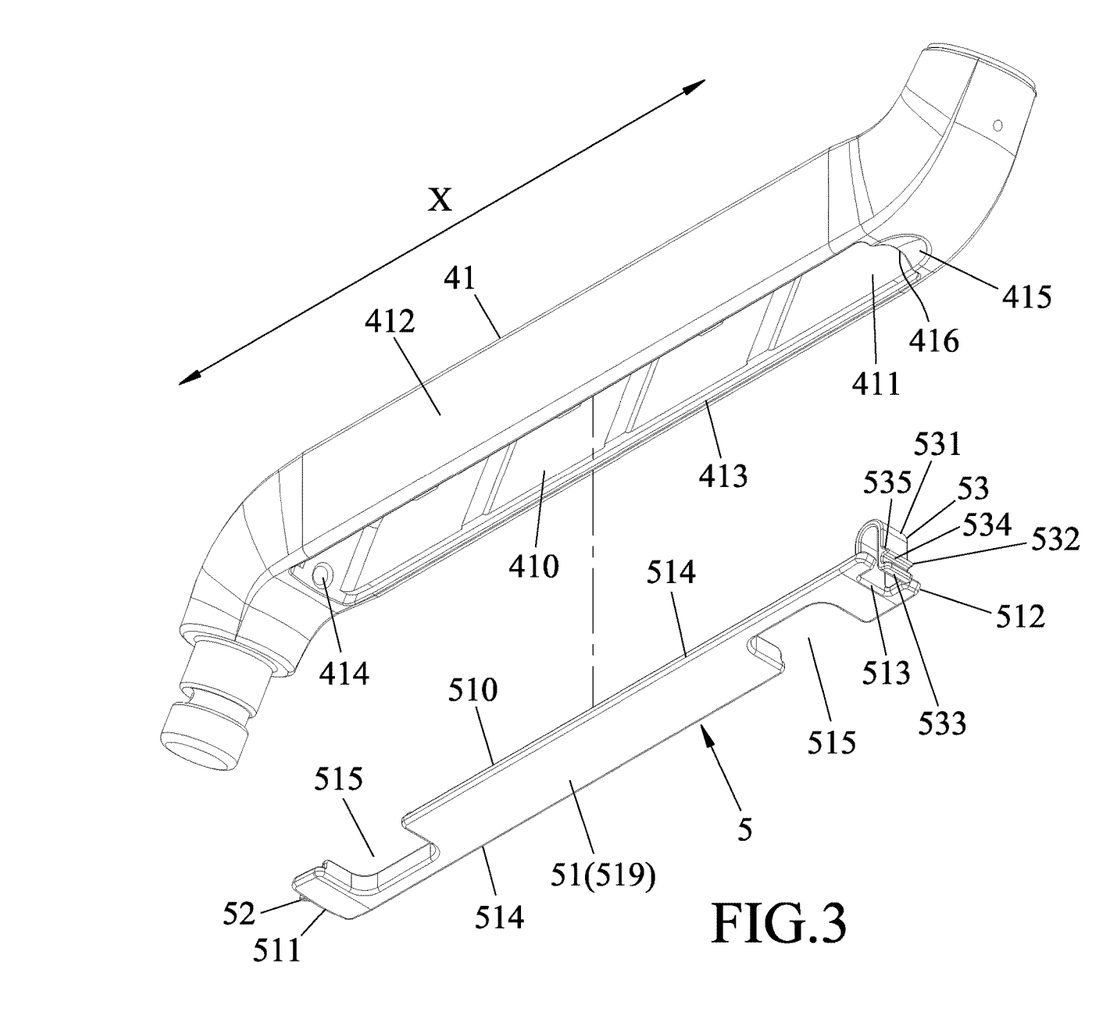
FIG. 3 is an exploded perspective view illustrating the first embodiment and a first extension arm of the extension arm support mechanism.
Figure 4:
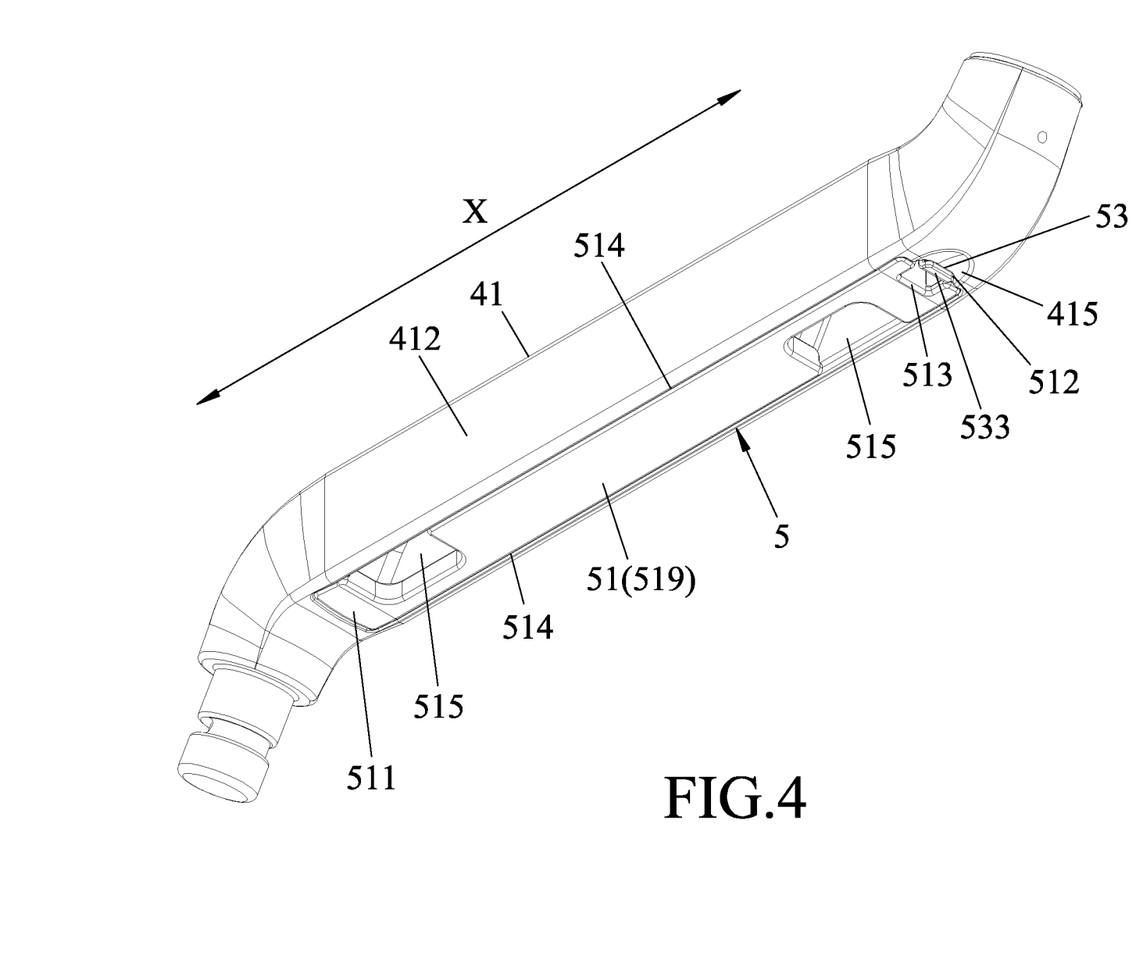
FIG. 4 is a perspective view illustrating the first embodiment mounted to the first extension arm.

In this embodiment, the first extension arm 41 is made from a metal material. Alternatively, the first extension arm 41 may be made from a plastic material. The engaging recess 414 may be a circular, rectangular, elongated or any other shape of hole.

The wire pressing and holding device 5 is removably mounted to the first extension arm 41, and includes a cover plate 51, an engaging protrusion 52 and a releasably retaining member 53. In this embodiment, the wire pressing and holding device 5 is integrally formed as a single piece made from a plastic material or a metal material.

Figure 5:
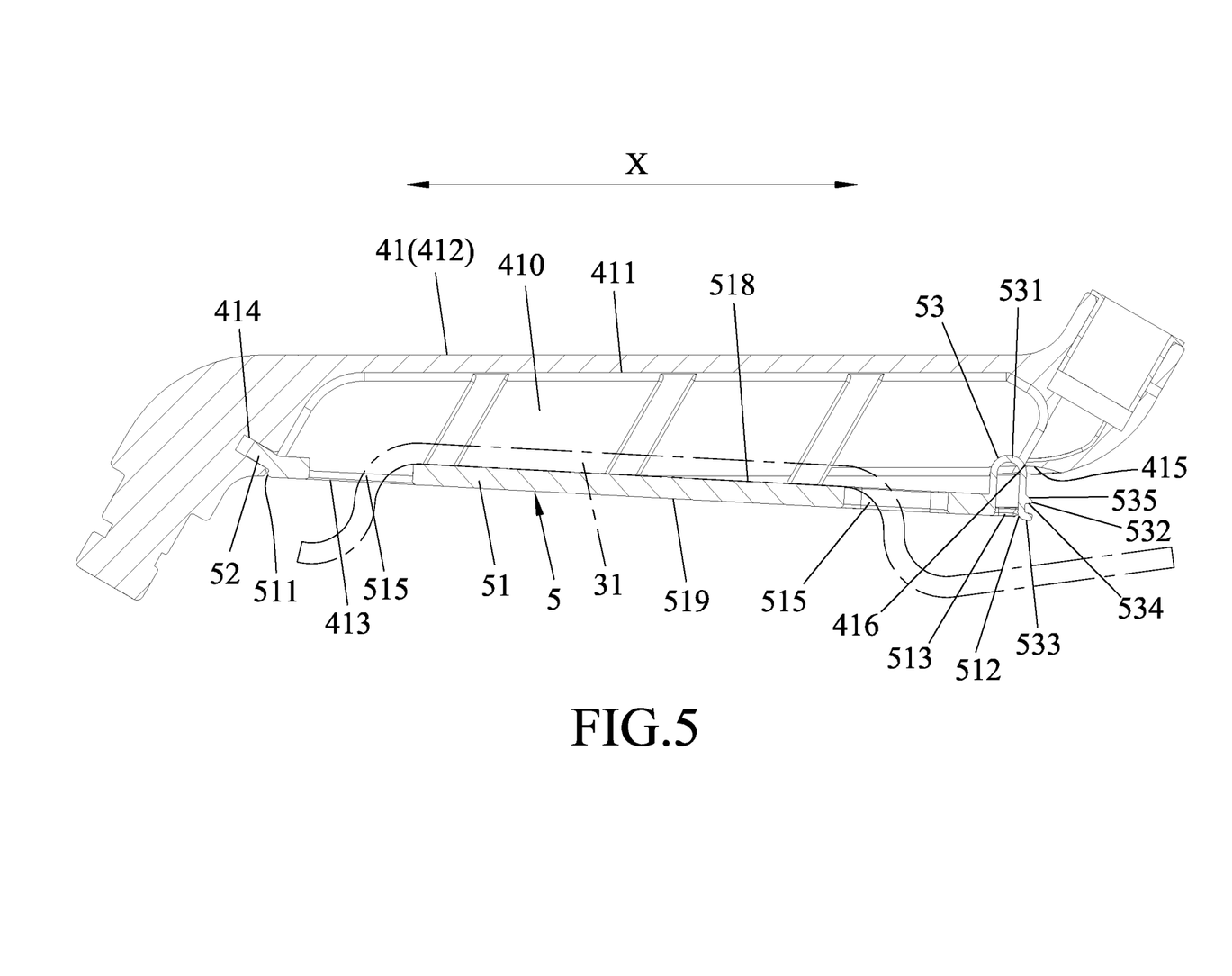
FIG. 5 is a sectional view illustrating a state where an engaging protrusion of the first embodiment is inserted into an engaging recess in the first extension arm.
Figure 6:
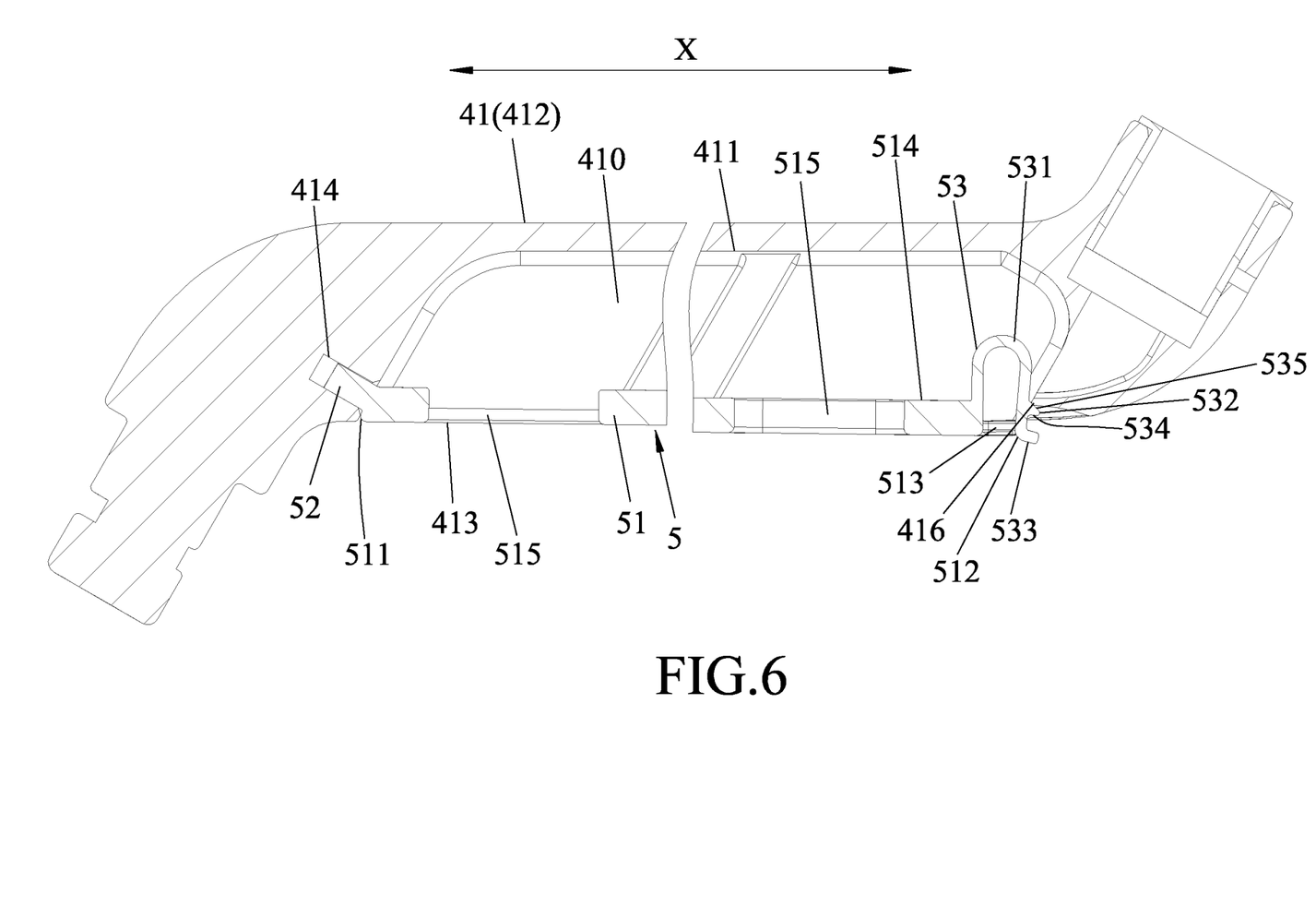
FIG. 6 is a fragmentary sectional view illustrating a state where a releasably retaining member of the first embodiment is pressed into a channel in the first extension arm.

The cover plate 51 has a peripheral rim 510 which is configured to matingly engage the opening and which has first and second ends 511, 512 opposite to each other in the longitudinal direction (X) and two long lateral sides 514 extending in the longitudinal direction (X) to interconnect the first and second ends 511, 512, and a plate wall 519 which is configured to close the channel 410 and which has an inner pressing wall surface 518 that confronts the channel 410 (see FIG. 5). A notch 513 is formed at the second end 512 and extends from the second end 512 toward the first end 511. Two penetrating bores 515 are formed through the cover plate 51 and are spaced apart from each other in the longitudinal direction (X). Each of the penetrating bores 515 is notched from one of the lateral sides 514 toward the other one of the lateral sides 514 and is communicated with the channel 410.

The engaging protrusion 52 projects from the first end 511 to be inserted into the engaging recess 414 to serve as a fulcrum such that the second end 512 of the cover plate 51 is turnable relative to the first extension arm 41 between an engaging position (see FIG. 7), where the second end 512 is close to the other one of the short sides of the inner channel wall surface 411 to allow the plate wall 519 to close the channel 410, and a disengaging position (see FIG. 5), where the second end 512 is remote from the other short side.

The releasably retaining member 53 is connected to the second end 512 of the cover plate 51 to be turned with the second end 512 relative to the first extension arm 41. Specifically, the releasably retaining member 53 has a U-shaped connecting portion 531 which is connected to and extends from the second end 512 to terminate at a retaining portion 532 that is disposed adjacent to the notch 513. Thus, the retaining portion 532 is displaceable relative to the second end 512 when the second end 512 of the cover plate 51 is in the engaging position between a retaining position (see FIG. 7), where the retaining portion 532 retainingly abuts against the other short side of the inner channel wall surface 411, and a releasing position (see FIG. 8), where the retaining portion 532 is disengaged from the other short side of the inner channel wall surface 411 and retracted into the notch 513. In this embodiment, the retaining portion 532 has an abutting surface 534 which is disposed to abut against the inner channel wall surface 411, and a guiding surface 535 which extends from and is inclined relative to the abutting surface 534 to define an included angle less than 90 degrees for facilitating insertion of the releasably retaining member 53 into the channel 410 to have the abutting surface 534 abutting against the inner channel wall surface 411 when the cover plate 51 is turned to the engaging position. Furthermore, the releasably retaining member 53 also has an operating portion 533 which is disposed adjacent to the retaining portion 532 and is to be spaced apart from the outer channel wall surface 412 by the concavity 415 when the releasably retaining member is in the retaining position so as to define therebetween an operating space for facilitating manual operation to displace the releasably retaining member 53 to the releasing position.

Figure 9:
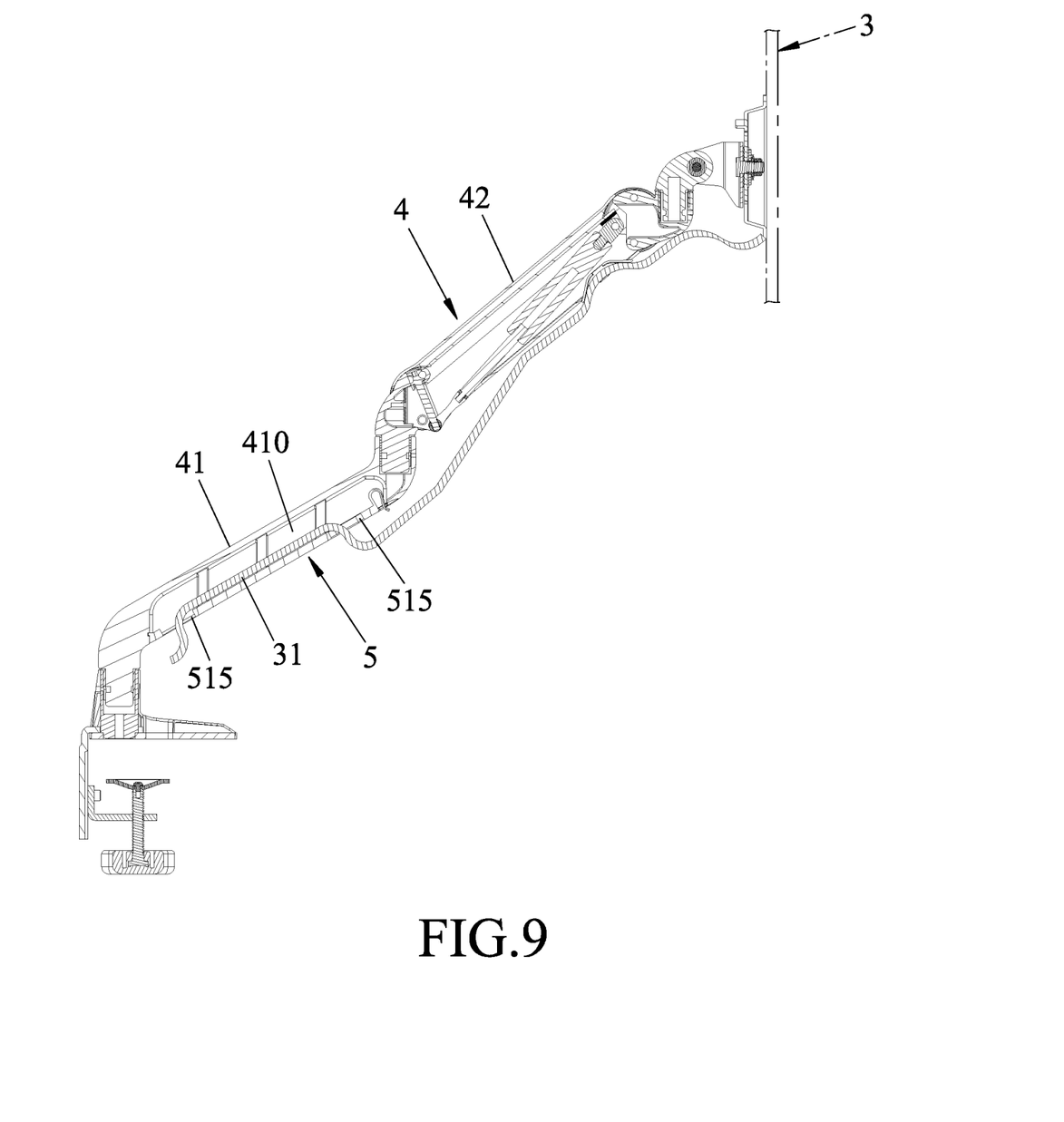
FIG. 9 is a sectional view illustrating the extension arm support mechanism with a wire assembly embedded in the first embodiment.

With reference to FIGS. 2, 5, 6 and 7, to hold the wire assembly 31, the engaging protrusion 52 is initially inserted into the engaging recess 414 such that the first end 511 abuts against the first extension arm 41. Subsequently, the wire assembly 31 is extended through the penetrating bores 515 of the cover plate 51, such that part of the wire assembly 31 is held and supported by the cover plate 51 to be housed within the channel 410 (see FIG. 9). To properly close the channel 140, the second end 512 of the cover plate 51 is turned toward the channel 410, with the engaging protrusion 52 acting as a fulcrum toward the other short side of the first extension arm 41, and the part of the wire assembly 31 is pressed by the inner pressing wall surface 518 of the cover plate 51 into the channel 410.

Figure 7:
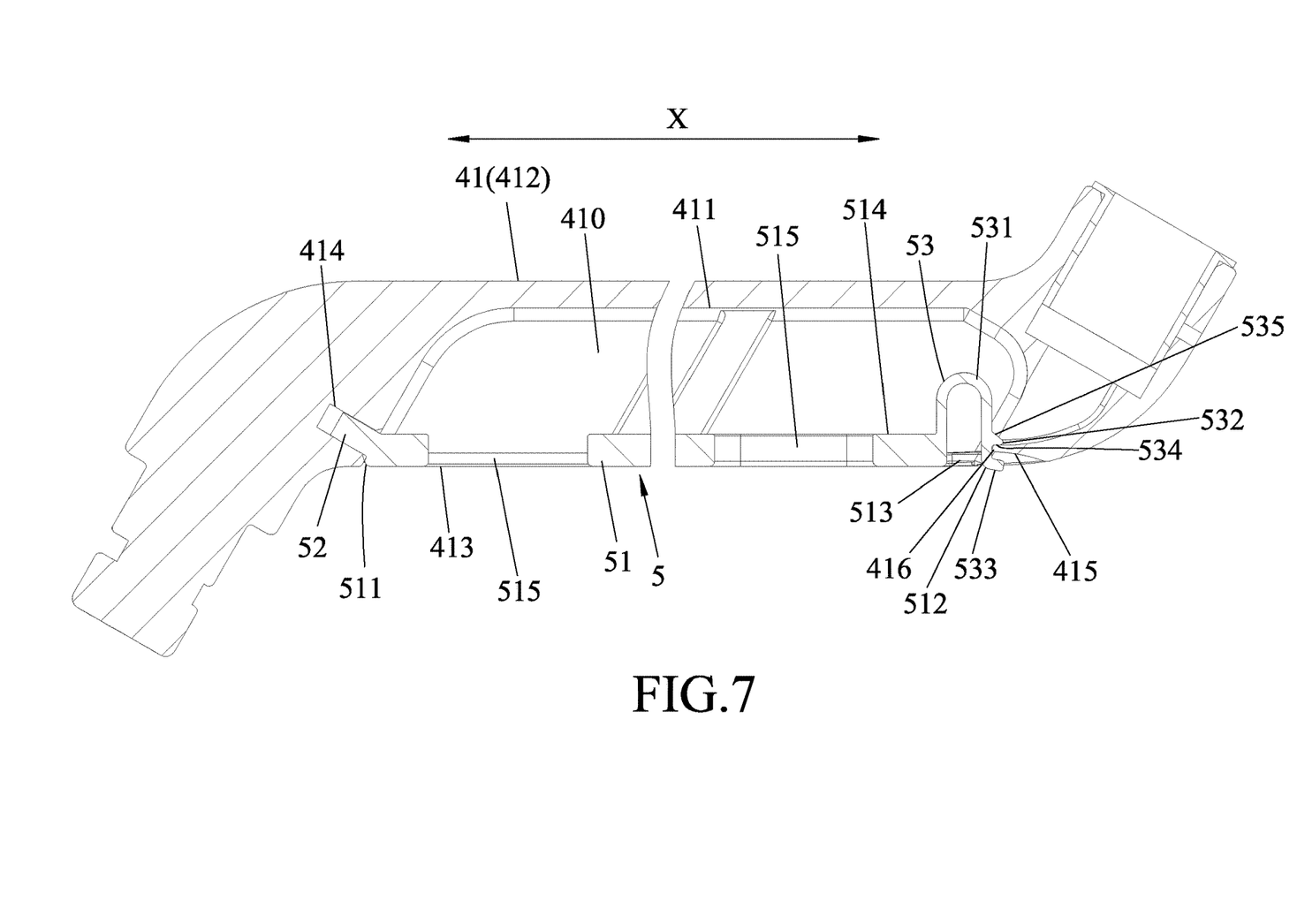
FIG. 7 is a fragmentary sectional view illustrating a state where the releasably retaining member is in a retaining position.

During this turning movement, the U-shaped connecting portion 531 of the releasably retaining member 53 is driven to be pressed on an edge section 416 of the concavity 415 at the other side (see FIG. 5), and the retaining member 53 is moved into the channel 410 through the sliding movement of the guiding surface 535 on the edge section 416 (see FIG. 6) until the retaining portion 532 abuts against the inner channel wall surface 411 to retain the cover plate 51 on the peripheral rim 413 (see FIG. 7). In this state, the second end 512 of the cover plate 51 is retained in the engaging position, where the cover plate 51 closes the channel 410 to hold the part of the wire assembly 31 in the channel 410 and allow the wire assembly 31 to pass through the penetrating bores 515 from or into the channel 410 (see FIG. 9).

More or less penetrating bores 515 can be provided in the cover plate 51. For example, one penetrating bore 515 is formed in the cover plate 51 such that the wire assembly 31 passes through this penetrating bore 515 from and into the channel 410.

Figure 2:
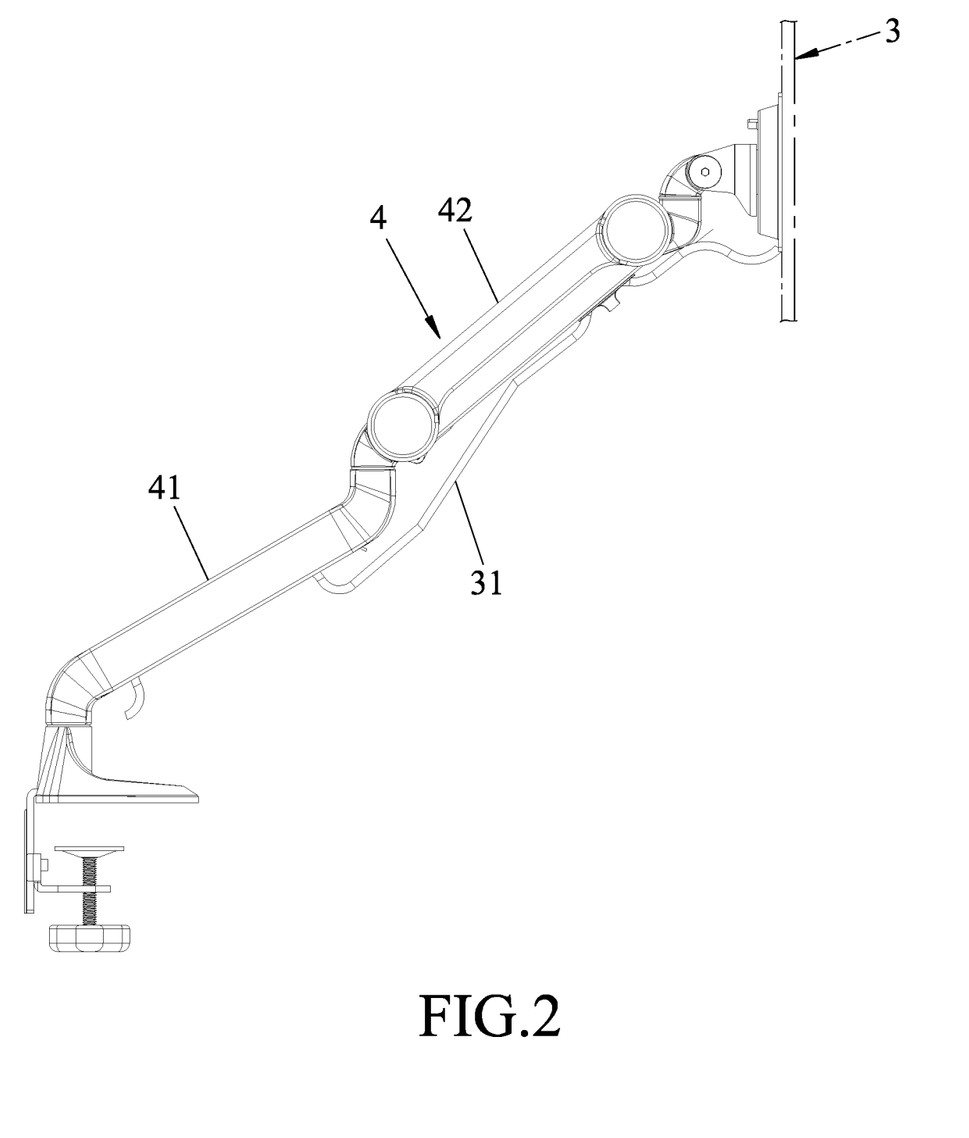
FIG. 2 is a schematic side view illustrating an extension arm support mechanism employed with a first embodiment of a wire pressing and holding device according to the disclosure.
Figure 8:
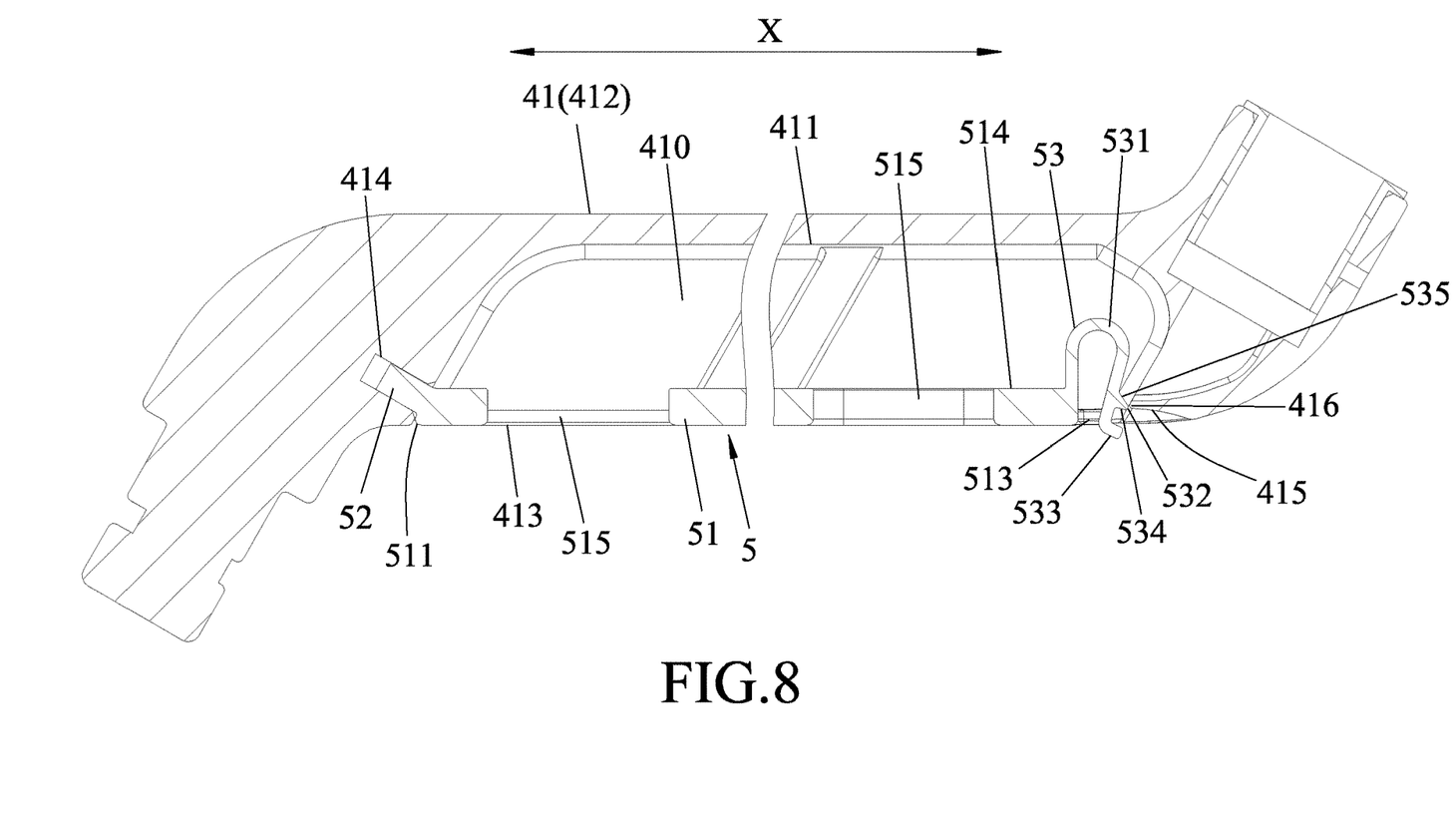
FIG. 8 is a fragmentary sectional view illustrating a state where the releasably retaining member is in a releasing position.

With reference to FIGS. 2 and 8, when it is desired to remove the wire assembly 31 and the wire pressing and holding device 5 from the first extension arm 41, the operating portion 533 is pressed by a user to retract the retaining portion 532 into the notch 513 so as to release the retaining portion 532 from the inner channel wall surface 411. The second end 512 of the cover plate 51 is then turned to the disengaging position to be away from the other short side of the first extension arm 41. In this state, the wire pressing and holding device 5 and the wire assembly 31 can be removed from the first extension arm 41.

Figure 10:
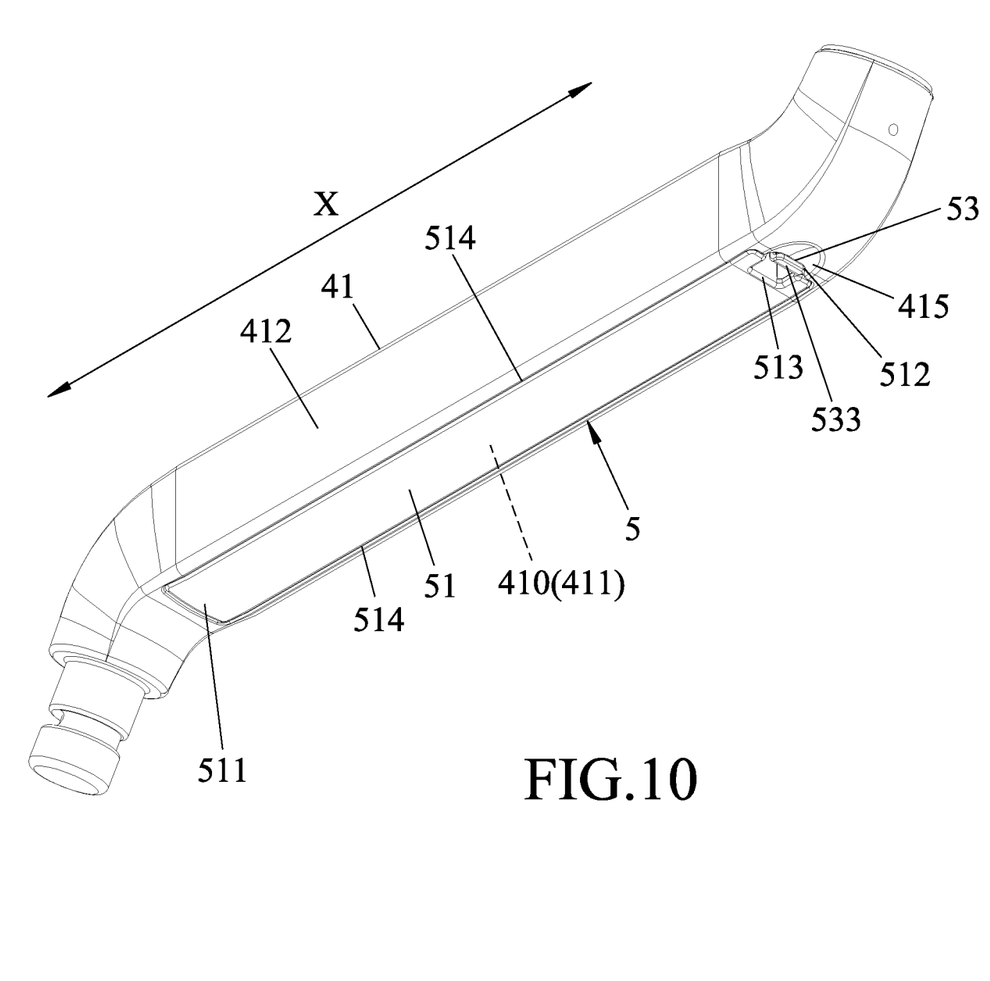
FIG. 10 is a perspective view illustrating a second embodiment of a wire pressing and holding device mounted to a first extension arm of an extension arm support mechanism.

Referring to FIG. 10, in a second embodiment, the cover plate 51 is disposed to cover the channel 410 without the penetrating bores 515 such that the wire assembly (not shown) is received and held in the channel 410.

Figure 11:
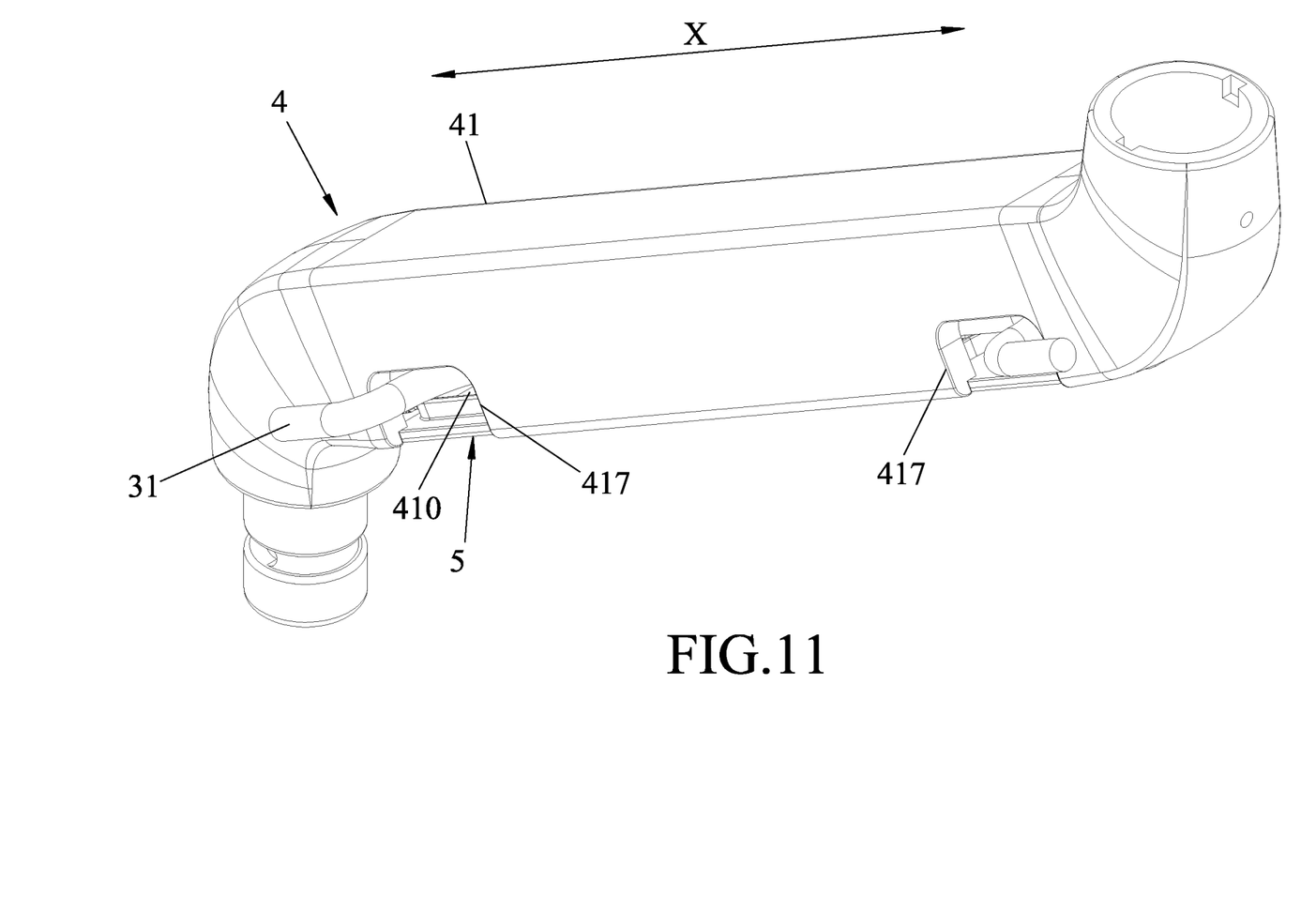
FIG. 11 is a perspective view illustrating a second embodiment of a wire pressing and holding device mounted to a first extension arm of an extension arm support mechanism.

Referring to FIG. 11, in a third embodiment, the penetrating bores 417 are formed through the first extension arm 41 and are communicated with the channel 410 instead of in the cover plate 51, so as to allow passing of a wire assembly 31 therethrough from or into the channel 410.

As illustrated, with the wire pressing and holding device 5 removably mounted to the first extension arm 41, a part of the wire assembly 31 can be held in the channel 410 and extends close to and along the first extension arm 41 to enhance the aesthetic appeal of the extension arm support mechanism 4 during use. Moreover, the wire pressing and holding device 5 can press and hold the wire assembly 31 in the channel 410 during the mounting operation of the wire pressing and holding device 5 on the first extension arm 41 such that the mounting operation thereof is convenient and smooth to conduct without interfere with the wire assembly 31. The wire pressing and holding device 5 is simple in construction.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An extension arm support mechanism comprising:
    an extension arm extending in a longitudinal direction and having a channel partially defined by two elongated side portions and two end portions, said two elongated side portions extending in the longitudinal direction, said two end portions being disposed at longitudinal ends of said two elongated side portions, said channel defining an elongated opening extending in the longitudinal direction, and a first one of said two end portions having an engaging recess communicated with said channel;
    a cover plate having a peripheral rim and a plate wall, said peripheral rim being configured to matingly engage said elongated opening of said channel, said peripheral rim having a first end, a second end opposite to said first end in the longitudinal direction, and two lateral sides extending in the longitudinal direction to interconnect said first and second ends, said plate wall being configured to cover said elongated opening of said channel and having an inner pressing wall surface that is adapted to face said channel, said cover plate defining two penetrating bores configured to be communicated with said channel to allow passing of a wire assembly therethrough from and into said channel, respectively, said two penetrating bores being spaced apart from each other in the longitudinal direction, each of said two penetrating bores being notched from one of said two lateral sides toward the other one of said two lateral sides, said cover plate further defining a notch located at said second end and extending from said second end toward said first end, and said notch being spaced apart from said two lateral sides;
    an engaging protrusion projecting from said first end to be inserted into said engaging recess to serve as a fulcrum such that said second end is turnable relative to said extension arm between an engaging position, where said second end is close to a second one of said two end portions, and a disengaging position, where said second end is remote from said second one of said two end portions; and
    a releasably retaining member being connected to said second end to be turned with said second end relative to said extension arm, said releasably retaining member being configured to be displaceable relative to said second end when said second end is in the engaging position between a retaining position, where said releasably retaining member retainingly abuts against said second one of said two end portions, and a releasing position, where said releasably retaining member is disengaged from said second one of said two end portions, said releasably retaining member having a retaining portion and an operating portion, wherein said retaining portion is configured to be retracted into said notch when said releasably retaining member is in the releasing position, wherein said operating portion is spaced apart from a concavity defined by an outer surface of said extension arm when said releasably retaining member is in the retaining position so as to define therebetween an operating space for facilitating manual operation to displace said releasably retaining member to the releasing position, and wherein said operating portion extends outwardly beyond said cover plate away from said channel when said releasably retaining member is in the retaining position.

2. The extension arm support mechanism as claimed in claim 1, wherein said releasably retaining member has a U-shaped connecting portion connected to and extending from said second end to terminate at said retaining portion such that said retaining portion is displaceable relative to said second end between the retaining position, where said retaining portion abuts against said second one of said two end portions, and the releasing position, where said retaining portion is disengaged from said second one of said two end portions and retracted into said notch.

3. The extension arm support mechanism as claimed in claim 2, wherein said retaining portion of said releasably retaining member has an abutting surface and a guiding surface, said abutting surface being disposed to abut against said second one of said two end portions, and said guiding surface extending from and being inclined relative to said abutting surface to define an included angle less than 90 degrees for facilitating insertion of said releasably retaining member into said channel to have said abutting surface abut against said second one of said two end portions when said cover plate is turned to the engaging position.

* * * * *